United States Patent
Liu et al.

(10) Patent No.: US 11,553,240 B2
(45) Date of Patent: Jan. 10, 2023

(54) METHOD, DEVICE AND APPARATUS FOR ADDING VIDEO SPECIAL EFFECTS AND STORAGE MEDIUM

(71) Applicant: BIGO TECHNOLOGY PTE. LTD., Singapore (SG)

(72) Inventors: Qing Liu, Guangzhou (CN); Leju Yan, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 17/419,035

(22) PCT Filed: Dec. 11, 2019

(86) PCT No.: PCT/CN2019/124583
§ 371 (c)(1),
(2) Date: Jun. 28, 2021

(87) PCT Pub. No.: WO2020/135055
PCT Pub. Date: Jul. 2, 2020

(65) Prior Publication Data
US 2022/0086521 A1    Mar. 17, 2022

(30) Foreign Application Priority Data
Dec. 28, 2018 (CN) .......................... 201811627586.9

(51) Int. Cl.
*H04N 5/265* (2006.01)
*H04N 5/272* (2006.01)
*H04N 21/431* (2011.01)
*G06F 16/78* (2019.01)
*H04N 21/44* (2011.01)

(52) U.S. Cl.
CPC ..... *H04N 21/4312* (2013.01); *G06F 16/7867* (2019.01); *H04N 5/265* (2013.01); *H04N 5/272* (2013.01); *H04N 21/44008* (2013.01)

(58) Field of Classification Search
CPC ......... H04N 21/4312; H04N 21/44008; H04N 5/265; H04N 5/272; G06F 16/7867
See application file for complete search history.

(56) References Cited

U.S. PATENT DOCUMENTS

| 6,323,914 B1 * | 11/2001 | Linzer | .................. | H04N 19/105 |
| | | | | 375/E7.218 |
| 2006/0182425 A1 * | 8/2006 | Boerger | .................. | H04N 5/775 |
| | | | | 386/248 |

(Continued)

FOREIGN PATENT DOCUMENTS

| CN | 1971622 A | 5/2007 |
| CN | 102263906 A | 11/2011 |

(Continued)

OTHER PUBLICATIONS

International Search Report Form PCT/ISA/210, and Written Opinion Form PCT/ISA/237, International Application No. PCT/CN2019/124583 pp. 1-5 International Filing Date Dec. 11, 2019 dated Mar. 16, 2020.

(Continued)

*Primary Examiner* — Thai Q Tran
*Assistant Examiner* — Jose M Mesa
(74) *Attorney, Agent, or Firm* — George McGuire

(57) ABSTRACT

Provided are a method, apparatus and device for adding a video special effect and a storage medium. The method includes: acquiring a source video sequence and at least one special effect video sequence; in the case where frame rates of the two or more than two special effect video sequences are same, inserting a frame into the source video sequence and superimposing the two or more than two special effect video sequences on the source video sequence at the same time; and in the case where frame rates of the two or more than two special effect video sequences are different, determining a target frame rate from the frame rates of the two or (Continued)

more than two special effect video sequences inserting frames into the source video sequence and then superimposing the two or more than two special effect video sequences on the source video sequence.

18 Claims, 2 Drawing Sheets

(56) References Cited

U.S. PATENT DOCUMENTS

| | | | |
|---|---|---|---|
| 2015/0294687 A1* | 10/2015 | Buick | G11B 27/036 386/280 |
| 2016/0293214 A1 | 10/2016 | Jones et al. | |
| 2018/0014067 A1 | 1/2018 | Schwartz et al. | |

FOREIGN PATENT DOCUMENTS

| | | |
|---|---|---|
| CN | 103686450 A | 3/2014 |
| CN | 105430537 A | 3/2016 |
| CN | 105763922 A | 7/2016 |
| CN | 107018442 A | 8/2017 |
| CN | 107644440 A | 1/2018 |
| JP | 2011193117 A | 9/2011 |

OTHER PUBLICATIONS

CN Office Action—application CN 201811627586.9.
First Search CN Application 201811627586.9.

* cited by examiner

METHOD, DEVICE AND APPARATUS FOR ADDING VIDEO SPECIAL EFFECTS AND STORAGE MEDIUM

CROSS-REFERENCE TO RELATED APPLICATIONS

This is a National Stage Application filed under 35 U.S.C. 371 based on International Patent Application No. PCT/CN2019/124583, filed on Dec. 11, 2019, which claims priority to Chinese Patent Application No. 201811627586.9 filed on Dec. 28, 2018, the disclosures of both of which are incorporated herein by reference in their entireties.

TECHNICAL FIELD

Embodiments of the present application relate to the field of video processing technologies and, for example, a method, apparatus and device for adding a video special effect and a storage medium.

BACKGROUND

In the process of video production, there is often an operation of superimposing a dynamic special effect. A video sequence of the special effect part (also referred to as a special effect sequence) generally has a stable frame rate, but the quality of the source video may be uneven. If the quality of the source video sequence is not high (the frame rate is relatively low or the rhythm is not smooth), the playback effect of the superimposed special effect is not smooth.

In the related art, the special effect is added in the following two manners: one is to superimpose directly according to the frame number, in this manner, if the frame rate of the special effect sequence is greater than the frame rate of the source video, the superimposed special effect is slowed down when being played and the effect is not good; the other is to remove part of the video frame of the special effect sequence so that the frame rate of the special effect sequence after this part of the video frame is removed is the same as the frame rate of the source video, and in this manner, the superimposed special effect may be stuck when being played.

SUMMARY

Embodiments of the present application provide a method and apparatus for adding a video special effect, a device, and a storage medium so that a special effect is added to a video and the playback fluency of the special effect is improved In an embodiment, embodiments of the present application provide a method for adding a video special effect. The method includes the steps described below A source video sequence and at least one special effect video sequence are acquired.

In the case where a number of the at least one special effect video sequence is one, a frame is inserted into the source video sequence and the special effect video sequence is superimposed on the source video sequence at the same time, or according to a frame rate of the special effect video sequence, frames are inserted into the source video sequence and then the special effect video sequence is superimposed on the source video sequence.

In the case where the at least one special effect video sequence comprises two or more than two special effect video sequences and frame rates of the two or more than two special effect video sequences are same, a frame is inserted into the source video sequence and the two or more than two special effect video sequences are superimposed on the source video sequence at the same time.

In the case where the at least one special effect video sequence comprises two or more than two special effect video sequences and frame rates of the two or more than two special effect video sequences are different, a target frame rate is determined from the frame rates of the two or more than two special effect video sequences according to a preset rule, and according to the target frame rate, a frame is inserted into the source video sequence and then the two or more than two special effect video sequences are superimposed on the source video sequence.

In an embodiment, embodiments of the present application provide an apparatus for adding a video special effect. The apparatus includes a special effect video sequence acquisition module, a special effect video sequence superimposing module, a frame inserting while superimposing module, and a frame inserting before superimposing module.

The special effect video sequence acquisition module is configured to acquire a source video sequence and at least one special effect video sequence.

The special effect video sequence superimposing module is configured to, in the case where a number of the at least one special effect video sequence is one, insert a frame into the source video sequence and superimpose the special effect video sequence on the source video sequence at the same time, or according to a frame rate of the special effect video sequence, insert frames into the source video sequence and then superimpose the special effect video sequence on the source video sequence.

The frame inserting while superimposing module is configured to, in the case where the at least one special effect video sequence comprises two or more than two special effect video sequences and frame rates of the two or more than two special effect video sequences are same, insert a frame into the source video sequence and superimpose the two or more than two special effect video sequences on the source video sequence at the same time.

The frame inserting before superimposing module is configured to, in the case where the at least one special effect video sequence comprises two or more than two special effect video sequences and frame rates of the two or more than two special effect video sequences are different, determine a target frame rate from the frame rates of the two or more than two special effect video sequences according to a preset rule, and according to the target frame rate, insert frames into the source video sequence and then superimpose the two or more than two special effect video sequences on the source video sequence.

In an embodiment, an embodiment of the present disclosure further provides a computer device. The computer device includes a memory, a processor, and computer programs stored in the memory and executable by the processor. The processor, when executing the programs, implements the method provided in embodiments of the present application.

In an embodiment, an embodiment of the present application further provides a computer-readable storage medium which is configured to store computer programs that, when executed by a processor, implement the method provided in embodiments of the present application.

DETAILED DESCRIPTION

Figure 1:
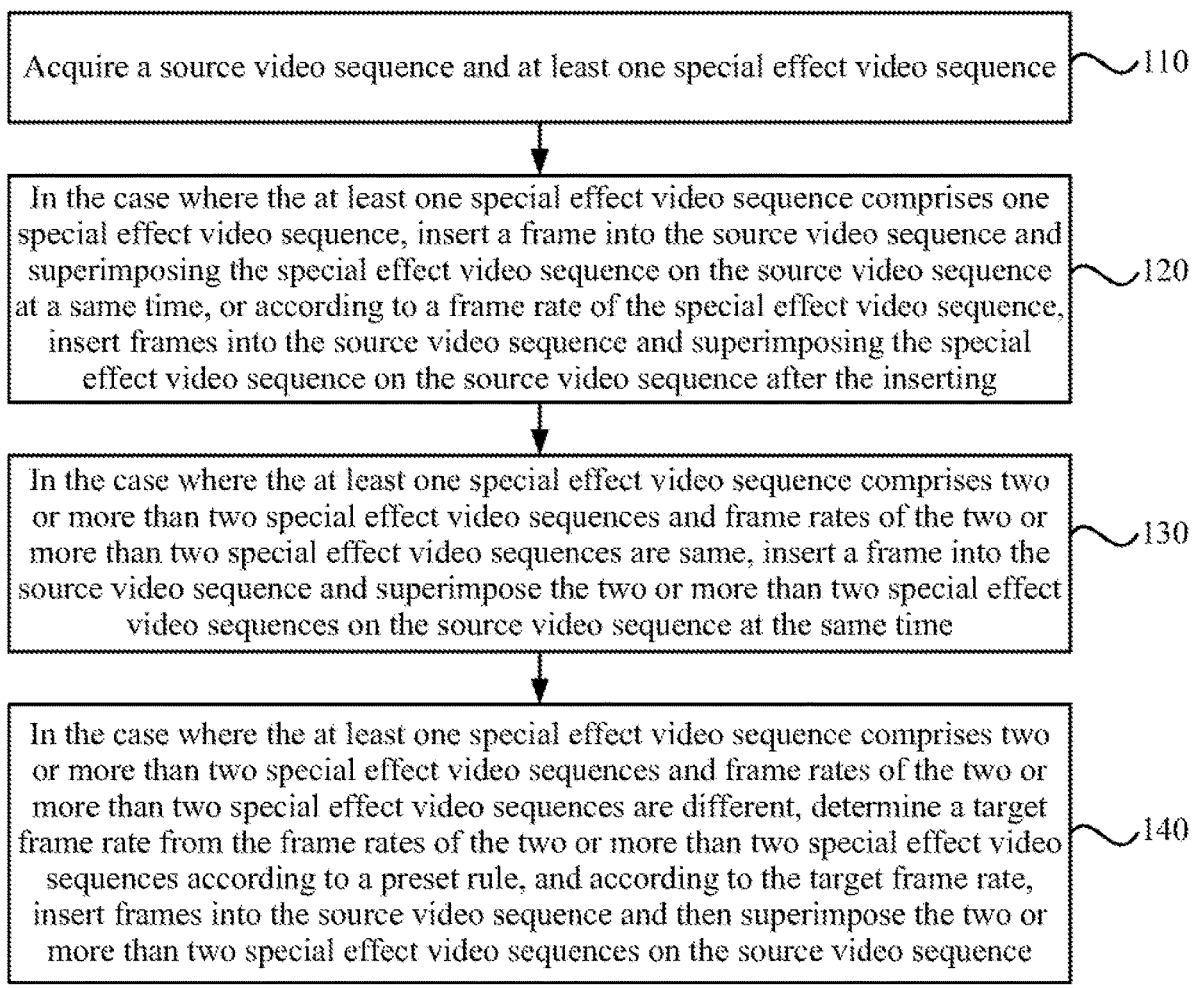
FIG. 1 is a flowchart of a method for adding a video special effect according to an embodiment of the present application.

The present application is described hereinafter in conjunction with drawings and embodiments. The embodiments described herein are intended to explain and not to limit the present application. Only part, not all, of structures related to the present application are illustrated in the drawings.

Embodiment One

FIG. 1 is a flowchart of a method for adding a video special effect according to an embodiment of the present application. This embodiment is applicable to the case of adding a special effect to a video. The method may be executed by an apparatus for adding a video special effect. The apparatus may be composed of hardware and/or software and generally be integrated in a device with a function of adding a video special effect. The device may be a server, a mobile terminal, or a server cluster and other electronic devices. As shown in FIG. 1, the method includes steps 110 to 140.

In step 110, a source video sequence and at least one special effect video sequence are acquired.

The source video sequence may be a sequence composed of video frames in a video segment to which a special effect is to be added. Each special effect video sequence may be a sequence composed of special effect frames. Each special effect frame may be a frame including a special effect. In this embodiment, the source video sequence may be a video captured by a user using a camera device, and the special effect video sequence may be a video including special effects produced by a professional.

In step 120, in the case where the at least one special effect video sequence comprises one special effect video sequence, a frame is inserted into the source video sequence and the special effect video sequence is superimposed on the source video sequence at the same time, or according to a frame rate of the special effect video sequence, frames are inserted into the source video sequence and then the special effect video sequence is superimposed on the source video sequence.

In the case where the number of the at least one special effect video sequence is only one, that is, in the case where only one special effect is added to the source video sequence, the manner of adding the special effect to the video may be to insert the frame into the source video sequence and superimpose the special effect video sequence on the source video sequence at the same time, or according to the frame rate of the special effect video sequence, to insert the frame into the source video sequence and then superimpose the special effect video sequence on the source video sequence. In this embodiment, the duration of the special effect video sequence is the same as the duration of the source video sequence. Before the special effect is added, timestamps of the special effect video sequence are aligned with timestamps of the source video sequence. The process of aligning the timestamps may be to acquire the timestamp of the first frame of the source video sequence, to correct special effect frames in the special effect video sequence according to the timestamp, and to add one time offset to each special effect frame in the special effect video sequence. In this manner, the timestamp of the first frame of the special effect video sequence is the same as the timestamp of the first frame of the source video sequence, and thus the timestamps are aligned. The source video sequence is a sequence composed of video frames to be superimposed with special effects.

In an embodiment, the step of inserting the frame into the source video sequence and superimposing the special effect video sequence on the source video sequence may be implemented in the following manner: determining a frame number of a target special effect frame in special effect frames that are not involved in superimposition in the special effect video sequence according to a timestamp of a current video frame in the source video sequence; in the case where the frame number of the target special effect frame is greater than a frame number of the current video frame, inserting one video frame before the current video frame and updating frame numbers of video frames in the source video sequence; superimposing the inserted video frame on the first frame of the special effect frames that are not involved in superimposition in the special effect video sequence; performing the preceding operation of determining a frame number of a target special effect frame in the special effect frames that are not involved in superimposition in the special effect video sequence according to a timestamp of a current video frame in the source video sequence until the frame number of the target special effect frame is not greater than a frame number of the current video frame, and superimposing the target special effect frame on the current video frame; and continuing performing frame inserting and superimposition by using a next video frame of the current video frame in the source video sequence as a current video frame until the source video sequence is traversed.

The current video frame is the first frame of video frames that are not involved in superimposition in the source video sequence. The frame numbers of the special effect frames are obtained by numbering the special effect frames in the special effect video sequence starting from the first frame in an ascending order. The frame numbers of the video frames are obtained by numbering the video frames in the source video sequence starting from the first frame in an ascending order. In this embodiment, the frame number of the first frame of the source video sequence and the frame number of the first frame of the special effect video sequence may be the same, for example, both are numbered 1.

According to the timestamp of the current video frame in the source video sequence, the frame number of the target special effect frame in the special effect frames that are not involved in superimposition in the special effect video sequence is determined according to the following formula: $j = \max\{n | T(E,n) \leq T(S,q)\}$, where j denotes the frame number of the target special effect frame, q denotes the frame number of the current video frame, $T(E,n)$ denotes the timestamp of a special effect frame with a frame number of n in the special effect video sequence, $T(S,q)$ denotes the timestamp of the current video frame in the source video sequence, n is a positive integer, S denotes the source video sequence, and E denotes the special effect video sequence. It may be known from the preceding formula that the process of acquiring the frame number of the target special effect frame is to acquire special effect frames whose timestamps are less than or equal to the timestamp of the current video frame in the special effect video sequence, to acquire frame numbers of the special effect frames, and to take a maximum value in the frame numbers of the special effect frames, that is, the frame number of the target special effect frame. In this embodiment, the inserted video frame is the same as a previous video frame of the current video frame, that is, the previous video frame is copied and inserted, and a timestamp of the inserted video frame is determined as a timestamp of the first frame of the special effect frames that are not involved in superimposition in the special effect video sequence so that timestamps of the two superimposed video frames are aligned.

In an embodiment, if the frame number of the target special effect frame is greater than the frame number of the current video frame, one frame that is the same as the previous frame of the current video frame is inserted before the current video frame, the frame numbers of the video frames in the source video sequence are updated, and the inserted video frame is superimposed on the first frame of the special effect frames that are not involved in superimposition in the special effect video sequence. The preceding operation of determining a frame number of a target special effect frame in the special effect frames that are not involved in superimposition in the special effect video sequence according to a timestamp of a current video frame in the source video sequence is performed until the frame number of the target special effect frame is not greater than a frame number of the current video frame, and the target special effect frame is superimposed on the current video frame. A next video frame in the source video sequence is used as a current video frame, and frame inserting and superimposition are performed continuously until the source video sequence is traversed so that the addition of the special effect is completed.

In an embodiment, the step of according to the frame rate of the special effect video sequence, inserting the frame into the source video sequence and then superimposing the special effect video sequence on the source video sequence may be implemented in the following manner: traversing the source video sequence, and in the case of traversing to the current video frame, calculating a timestamp difference between the current video frame and the first frame of the source video sequence; multiplying the timestamp difference by the frame rate of the special effect video sequence to obtain a number of target frames; subtracting the frame number of the current video frame from the number of target frames to obtain a number of frames to be inserted; insert video frames with the number of frames to be inserted between the current video frame and the previous video frame of the current video frame at a set step length; and superimposing the source video sequence into which frames are inserted on the special effect video sequence.

The calculation formula of the step length may be:

$$t = \frac{T1 - T2}{M + 1},$$

where T1 denotes the timestamp of the current video frame, T2 denotes the timestamp of the previous video frame, and M denotes the number of frames to be inserted. In the case where the current video frame is not the first frame of the source video sequence, the inserted video frame is the same as the previous video frame of the current video frame. Exemplarily, it is assumed that two video frames are inserted between the current video frame and the previous video frame, the timestamps of multiple video frames after frames are inserted are T2, T2+t, T2+2t, and T1, respectively. After frames are inserted into the source video sequence, the frame rate of the source video sequence is the same as the frame rate of the special effect video sequence, and the corresponding superimposition is performed according to the frame number.

In step 130, in the case where the at least one special effect video sequence comprises two or more than two special effect video sequences and frame rates of the two or more than two special effect video sequences are same, a frame is inserted into the source video sequence and the two or more than two special effect video sequences are superimposed on the source video sequence at the same time.

In the case where the at least one special effect video sequence comprises two or more than two special effect video sequences and frame rates of the two or more than two special effect video sequences are same, three situations where multiple special effect video sequences are added are as follows: multiple special effects completely overlap, multiple special effects partially overlap, or multiple special effects do not overlap. In the case where multiple special effects do not overlap, each special effect is implemented in the manner of inserting the frame while performing superimposition as in the preceding case where one special effect video sequence exists. In the case where multiple special effects completely overlap, the manner of inserting the frame into the source video sequence and superimposing the special effect video sequences on the source video sequence may be: determining a frame number of a target special effect frame in special effect frames that are not involved in superimposition in the multiple special effect video sequences according to a timestamp of a current video frame in the source video sequence; in the case where the frame number of the target special effect frame is greater than a frame number of the current video frame, inserting one video frame before the current video frame and updating frame numbers of video frames in the source video sequence; superimposing the inserted video frame on the first frame of the special effect frames that are not involved in superimposition in the multiple special effect video sequences; performing the preceding operation of determining a frame number of a target special effect frame in the special effect frames that are not involved in superimposition in the multiple special effect video sequences according to a timestamp of a current video frame in the source video sequence until the frame number of the target special effect frame is not greater than a frame number of the current video frame, and superimposing multiple target special effect frames on the current video frame; and continuing performing frame inserting and superimposition by using a next video frame in the source video sequence as a current video frame until the source video sequence is traversed. In the case where multiple special effects partially overlap, the non-overlapping part is implemented in the manner of inserting the frame while performing superimposition as in the preceding case where one special effect video sequence exists, and the overlapping part is implemented in the manner of inserting the frame while performing superimposition as in the preceding case where multiple special effect video sequences completely overlap.

In step 140, in the case where the at least one special effect video sequence comprises two or more than two special effect video sequences and frame rates of the two or more than two special effect video sequences are different, a target frame rate is determined from the frame rates of the two or more than two special effect video sequences according to a preset rule, and according to the target frame rate, a frame is inserted into the source video sequence and then the two or more than two special effect video sequences are superimposed on the source video sequence.

The preset rule may be to select a maximum value of the frame rates of the two or more than two special effect video sequences as the target frame rate, or determine the target frame rate according to the actual standard (for example, 30 frames per second (fps)). In the case where the at least one special effect video sequence comprises two or more than two special effect video sequences and frame rates of the two or more than two special effect video sequences are different, the process of inserting the frame on the source video sequence according to the target frame rate is the same as the process of inserting the frame on the source video sequence according to the frame rate of the special effect video sequence in the preceding case where one special effect video sequence exists.

The frame rate of the source video sequence into which the frame is inserted is the same as the target frame rate. The case where the frame is inserted into the source video frame and the special effect video sequence is superimposed on the source video sequence includes the following three cases: the frame rate of the special effect video sequence is equal to the target frame rate; the frame rate of the special effect video sequence is greater than the target frame rate; and the frame rate of the special effect video sequence is less than the target frame rate. In the case where the frame rate of the special effect video sequence is equal to the target frame rate, the source video sequence and the special effect video sequence are superimposed correspondingly according to the frame number. In the case where the frame rate of the special effect video sequence is greater than or less than the target frame rate, for the current video frame, special effect frames whose timestamps are less than or equal to the timestamp of the current video frame are acquired in the special effect video sequence, and a special effect frame whose timestamp is the maximum among the timestamps of the obtained special effect frames is superimposed on the current video frame. In the case where the frame rate of the special effect video sequence is greater than the target frame rate, this method is equivalent to deleting the frames of the special effect video sequence. In the case where the frame rate of the special effect video sequence is greater than the target frame rate, this method is equivalent to superimposing multiple video frames on the same special effect frame.

In the technical solution of this embodiment, a source video sequence and at least one special effect video sequence are acquired; in the case where the at least one special effect video sequence comprises one special effect video sequence, a frame is inserted into the source video sequence and the special effect video sequence is superimposed on the source video sequence at the same time, or according to a frame rate of the special effect video sequence, frames are inserted into the source video sequence and then the special effect video sequence is superimposed on the source video sequence; in the case where the at least one special effect video sequence comprises two or more than two special effect video sequences and frame rates of the two or more than two special effect video sequences are same, a frame is inserted into the source video sequence and the two or more than two special effect video sequences are superimposed on the source video sequence at the same time; in the case that the at least one special effect video sequence comprises two or more than two special effect video sequences and frame rates of the two or more than two special effect video sequences are different, a target frame rate is determined from the frame rates of the two or more than two special effect video sequences according to a preset rule, and according to the target frame rate, a frame is inserted into the source video sequence and then the two or more than two special effect video sequences are superimposed on the source video sequence. In the method for adding a video special effect provided in embodiments of the present application, the manner of inserting the frame and performing superimposition is determined according to the number and frame rates of the special effect video sequences, and the frame is inserted into the source video sequence so that the playback fluency can be improved after the special effect video sequences are added to the source video.

Embodiment Two

Figure 2:
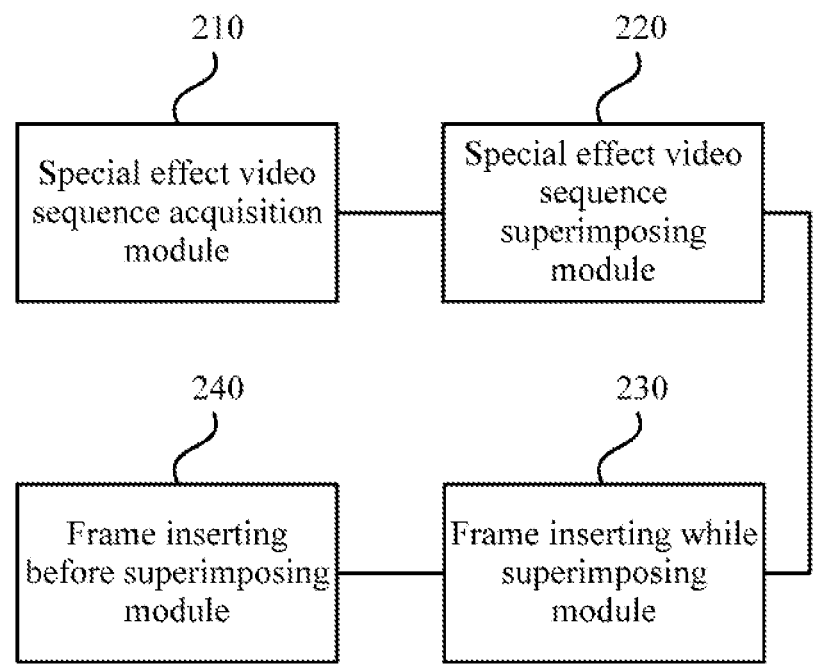
FIG. 2 is a structure diagram of an apparatus for adding a video special effect according to an embodiment of the present application.

FIG. 2 is a structure diagram of an apparatus for adding a video special effect according to an embodiment of the present application. As shown in FIG. 2, the apparatus includes a special effect video sequence acquisition module 210, a special effect video sequence superimposing module 220, a frame inserting while superimposing module 230, and a frame inserting before superimposing module 240. The apparatus for adding a video special effect in this embodiment can perform the method provided in this embodiment.

The special effect video sequence acquisition module 210 is configured to acquire a source video sequence and at least one special effect video sequence.

The special effect video sequence superimposing module 220 is configured to, in the case where a number of the at least one special effect video sequence is one, insert a frame into the source video sequence and superimpose the special effect video sequence on the source video sequence at the same time, or according to a frame rate of the special effect video sequence, insert frames into the source video sequence and then superimpose the special effect video sequence on the source video sequence.

The frame inserting while superimposing module 230 is configured to, in the case where the at least one special effect video sequence comprises two or more than two special effect video sequences and frame rates of the two or more than two special effect video sequences are same, insert a frame into the source video sequence and superimpose the two or more than two special effect video sequences on the source video sequence at the same time.

The frame inserting before superimposing module 240 is configured to, in the case where the at least one special effect video sequence comprises two or more than two special effect video sequences and frame rates of the two or more than two special effect video sequences are different, determine a target frame rate from the frame rates of the two or more than two special effect video sequences according to a preset rule, and according to the target frame rate, insert frames into the source video sequence and then superimpose the two or more than two special effect video sequences on the source video sequence.

In an embodiment, the frame inserting while superimposing module 230 is further configured to perform the steps described below.

A frame number of a target special effect frame in special effect frames that are not involved in superimposition in the at least one special effect video sequence is determined according to a timestamp of a current video frame in the source video sequence.

In the case where the frame number of the target special effect frame is greater than a frame number of the current video frame, one video frame is inserted before the current video frame, and frame numbers of video frames in the source video sequence are updated.

The inserted video frame is superimposed on the first frame of the special effect frames that are not involved in superimposition in the at least one special effect video sequence.

The preceding operation of determining a frame number of a target special effect frame in the special effect frames that are not involved in superimposition in the at least one special effect video sequence according to a timestamp of a current video frame in the source video sequence is performed until the frame number of the target special effect frame is not greater than a frame number of the current video frame, and the target special effect frame is superimposed on the current video frame.

A next video frame of the current video frame in the source video sequence is used as a current video frame, and frame inserting and superimposition are performed continuously until the source video sequence is traversed.

Embodiment Three

Figure 3:
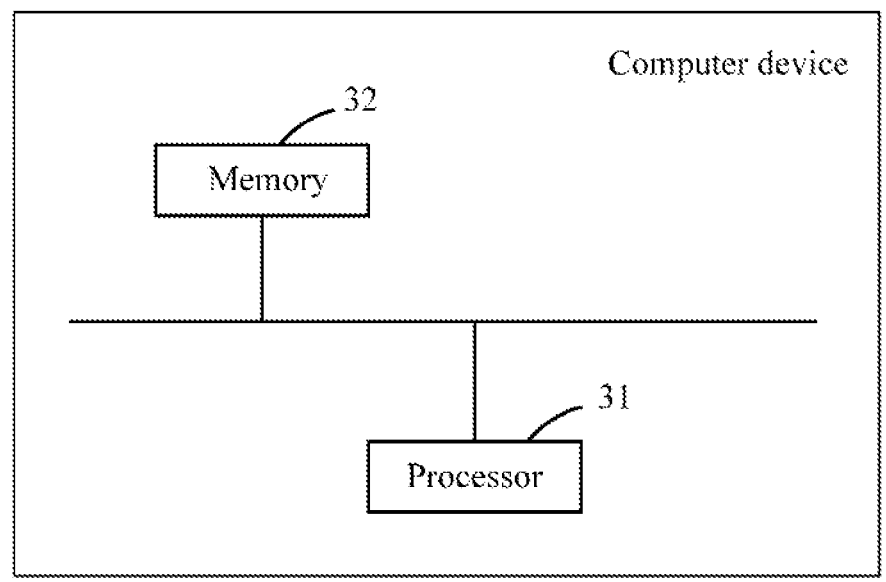
FIG. 3 is a structure diagram of a computer device according to an embodiment of the present application.

FIG. 3 is a structure diagram of a computer device according to an embodiment of the present application. As shown in FIG. 3, the computer device provided in this embodiment includes a processor 31 and a memory 32. The number of processors in the computer device may be one or more, and one processor 31 is used as an example in FIG. 3 for illustration. The processor 31 and the memory 32 in the computer device may be connected via a bus or in other manners, and connecting via a bus is used as an example in FIG. 3 for illustration.

The processor 31 of the computer device in this embodiment integrates the apparatus provided in the preceding embodiments. In addition, the memory 32 in the computer device is used as a computer-readable storage medium and may be configured to store one or more programs. The programs may be software programs, computer-executable programs, and modules such as the program instructions/modules corresponding to the method in embodiments of the present application. The processor 31 executes software programs, instructions, and modules stored in the memory 32 to perform multiple functional applications and data processing of the device, that is, to implement the preceding method.

Embodiment Four

Embodiments of the present application further provide a computer-readable storage medium which is configured to store computer programs that, when executed by a processor, implement the method provided in embodiments of the present application.

What is claimed is:

1. A method for adding a video special effect, comprising:
acquiring a source video sequence and at least one special effect video sequence;
in a case where the at least one special effect video sequence comprises one special effect video sequence, inserting a frame into the source video sequence and superimposing the special effect video sequence on the source video sequence at a same time, or according to a frame rate of the special effect video sequence, inserting frames into the source video sequence and superimposing the special effect video sequence on the source video sequence after the inserting;
in a case where the at least one special effect video sequence comprises two or more than two special effect video sequences and frame rates of the two or more than two special effect video sequences are same, inserting a frame into the source video sequence and superimposing the two or more than two special effect video sequences on the source video sequence at a same time; and
in a case where the at least one special effect video sequence comprises two or more than two special effect video sequences and frame rates of the two or more than two special effect video sequences are different, determining a target frame rate from the frame rates of the two or more than two special effect video sequences according to a preset rule, and according to the target frame rate, inserting frames into the source video sequence and then superimposing the two or more than two special effect video sequences on the source video sequence.

2. The method of claim 1, wherein inserting the frame into the source video sequence and superimposing the at least one special effect video sequence on the source video sequence at the same time comprises:
determining a frame number of a target special effect frame in special effect frames that are not involved in superimposition in the at least one special effect video sequence according to a timestamp of a current video frame in the source video sequence;
in a case where the frame number of the target special effect frame is greater than a frame number of the current video frame, inserting a video frame before the current video frame and updating frame numbers of video frames in the source video sequence;
superimposing the video frame inserted on a first frame of the special effect frames that are not involved in superimposition in the at least one special effect video sequence;
reperforming the step of determining a frame number of a target special effect frame in the special effect frames that are not involved in superimposition in the at least one special effect video sequence according to a timestamp of a current video frame in the source video sequence until the frame number of the target special effect frame is not greater than a frame number of the current video frame, and superimposing the target special effect frame on the current video frame; and
reperforming the inserting and the superimposing by taking a next video frame of the current video frame in the source video sequence as a current video frame until the source video sequence is traversed.

3. The method of claim 2, wherein the step of determining the frame number of the target special effect frame in the special effect frames that are not involved in superimposition in the at least one special effect video sequence according to the timestamp of the current video frame in the source video sequence is performed according to a following formula:
$j=\max\{n|T(E,n) \leq T(S,q)\}$, wherein j denotes the frame number of the target special effect frame, q denotes the frame number of the current video frame, $T(E, n)$ denotes a timestamp of a special effect frame with a frame number of n in the at least one special effect video sequence, $T(S, q)$ denotes the timestamp of the current video frame in the source video sequence, n is a positive integer, S denotes the source video sequence, and E denotes the at least one special effect video sequence.

4. The method of claim 2, wherein after inserting the one video frame before the current video frame and updating the frame numbers of the video frames in the source video sequence, the method further comprises:
determining a timestamp of the video frame inserted as a timestamp of the first frame of the special effect frames that are not involved in superimposition in the at least one special effect video sequence.

5. The method of claim 1, wherein according to the target frame rate, inserting the frames into the source video sequence and superimposing the at least one special effect video sequence on the source video sequence comprises:
traversing the source video sequence, and in response to traversing to a current video frame of the source video sequence, calculating a timestamp difference between the current video frame and a first frame of the source video sequence;
multiplying the timestamp difference by the target frame rate to obtain a number of target frames;
subtracting a frame number of the current video frame from the number of target frames to obtain a number of frames to be inserted;
inserting video frames with the number of frames to be inserted between the current video frame and a previous video frame of the current video frame at a set step length; and
superimposing the source video sequence after inserting on the at least one special effect video sequence.

6. The method of claim 2, wherein in a case where the current video frame is not a first frame of the source video sequence, the video frame inserted is same as a previous video frame of the current video frame.

7. A computer device, comprising a memory, a processor, and computer programs stored in the memory and executable by the processor, wherein the processor, when executing the programs, implements:
acquiring a source video sequence and at least one special effect video sequence;
in a case where the at least one special effect video sequence comprises one special effect video sequence, inserting a frame into the source video sequence and superimposing the special effect video sequence on the source video sequence at a same time, or according to a frame rate of the special effect video sequence, inserting frames into the source video sequence and superimposing the special effect video sequence on the source video sequence after the inserting;
in a case where the at least one special effect video sequence comprises two or more than two special effect video sequences and frame rates of the two or more than two special effect video sequences are same, inserting a frame into the source video sequence and superimposing the two or more than two special effect video sequences on the source video sequence at a same time; and
in a case where the at least one special effect video sequence comprises two or more than two special effect video sequences and frame rates of the two or more than two special effect video sequences are different, determining a target frame rate from the frame rates of the two or more than two special effect video sequences according to a preset rule, and according to the target frame rate, inserting frames into the source video sequence and then superimposing the two or more than two special effect video sequences on the source video sequence.

8. A non-transitory computer-readable storage medium, which is configured to store computer programs that, when executed by a processor, implement the method of claim 1.

9. The method of claim 5, wherein in a case where the current video frame is not a first frame of the source video sequence, the video frame inserted is same as a previous video frame of the current video frame.

10. The computer device of claim 7, wherein the processor, when executing the programs, implements;
determining a frame number of a target special effect frame in special effect frames that are not involved in superimposition in the at least one special effect video sequence according to a timestamp of a current video frame in the source video sequence;
in a case where the frame number of the target special effect frame is greater than a frame number of the current video frame, inserting a video frame before the current video frame and updating frame numbers of video frames in the source video sequence;
superimposing the video frame inserted on a first frame of the special effect frames that are not involved in superimposition in the at least one special effect video sequence;
reperforming the step of determining a frame number of a target special effect frame in the special effect frames that are not involved in superimposition in the at least one special effect video sequence according to a timestamp of a current video frame in the source video sequence until the frame number of the target special effect frame is not greater than a frame number of the current video frame, and superimposing the target special effect frame on the current video frame; and
reperforming the inserting and the superimposing by taking a next video frame of the current video frame in the source video sequence as a current video frame until the source video sequence is traversed.

11. The computer device of claim 7, wherein the step of determining the frame number of the target special effect frame in the special effect frames that are not involved in superimposition in the at least one special effect video sequence according to the timestamp of the current video frame in the source video sequence is performed according to a following formula:
$j = \max\{n | T(E,n) \leq T(S,q)\}$, wherein j denotes the frame number of the target special effect frame, q denotes the frame number of the current video frame, $T(E, n)$ denotes a timestamp of a special effect frame with a frame number of n in the at least one special effect video sequence, $T(S, q)$ denotes the timestamp of the current video frame in the source video sequence, n is a positive integer, S denotes the source video sequence, and E denotes the at least one special effect video sequence.

12. The computer device of claim 7, wherein the processor, when executing the programs, implements;
determining a timestamp of the video frame inserted as a timestamp of the first frame of the special effect frames that are not involved in superimposition in the at least one special effect video sequence.

13. The computer device of claim 7, wherein the processor, when executing the programs, implements;
traversing the source video sequence, and in response to traversing to a current video frame of the source video sequence, calculating a timestamp difference between the current video frame and a first frame of the source video sequence;
multiplying the timestamp difference by the target frame rate to obtain a number of target frames;

subtracting a frame number of the current video frame from the number of target frames to obtain a number of frames to be inserted;

inserting video frames with the number of frames to be inserted between the current video frame and a previous video frame of the current video frame at a set step length; and superimposing the source video sequence after inserting on the at least one special effect video sequence.

14. The computer device of claim 10, wherein in a case where the current video frame is not a first frame of the source video sequence, the video frame inserted is same as a previous video frame of the current video frame.

15. A non-transitory computer-readable storage medium, which is configured to store computer programs that, when executed by a processor, implement the method of claim 2.

16. A non-transitory computer-readable storage medium, which is configured to store computer programs that, when executed by a processor, implement the method of claim 3.

17. A non-transitory computer-readable storage medium, which is configured to store computer programs that, when executed by a processor, implement the method of claim 4.

18. A non-transitory computer-readable storage medium, which is configured to store computer programs that, when executed by a processor, implement the method of claim 5.

* * * * *